(12) United States Patent
Fujiki

(10) Patent No.: US 9,021,540 B2
(45) Date of Patent: Apr. 28, 2015

(54) INFORMATION PROCESSING APPARATUS, INFORMATION PROCESSING METHOD, AND PROGRAM

(75) Inventor: Takeshi Fujiki, Nagano (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/437,224

(22) Filed: Apr. 2, 2012

(65) Prior Publication Data

US 2012/0260288 A1    Oct. 11, 2012

(30) Foreign Application Priority Data

Apr. 11, 2011   (JP) .................................. 2011-087059

(51) Int. Cl.
*H04N 5/445*   (2011.01)
*H04N 7/173*   (2011.01)
*H04L 12/58*   (2006.01)

(52) U.S. Cl.
CPC ................ *H04L 51/08* (2013.01); *H04L 51/28* (2013.01)

(58) Field of Classification Search
CPC .. H04N 21/47; H04N 21/472; H04N 21/4722
USPC .......................................... 725/110, 112, 37
See application file for complete search history.

(56) References Cited

U.S. PATENT DOCUMENTS

| | | | |
|---|---|---|---|
| 7,568,167 B2* | 7/2009 | Van Dok et al. ............... | 715/789 |
| 7,783,708 B2* | 8/2010 | Zaner-Godsey et al. ..... | 709/206 |
| 8,146,004 B2* | 3/2012 | Koch ............................. | 715/758 |
| 2002/0049853 A1* | 4/2002 | Chu et al. ....................... | 709/237 |
| 2007/0250767 A1* | 10/2007 | Wisniewski ................... | 715/513 |
| 2008/0016222 A1* | 1/2008 | Ihara et al. ..................... | 709/226 |
| 2008/0212490 A1* | 9/2008 | Greve et al. ................... | 370/254 |
| 2008/0276279 A1* | 11/2008 | Gossweiler et al. ........... | 725/46 |
| 2008/0299953 A1* | 12/2008 | Rao ............................ | 455/414.1 |
| 2009/0106666 A1 | 4/2009 | Nomura | |
| 2010/0262916 A1* | 10/2010 | Jones et al. .................... | 715/733 |
| 2011/0161449 A1* | 6/2011 | Callanan et al. .............. | 709/206 |
| 2011/0263321 A1* | 10/2011 | Kurisu et al. ................... | 463/29 |
| 2011/0302257 A1* | 12/2011 | Asher ........................... | 709/206 |
| 2012/0066602 A1* | 3/2012 | Chai et al. ..................... | 715/733 |
| 2012/0089538 A1* | 4/2012 | Ihara et al. ..................... | 705/418 |
| 2012/0124644 A1* | 5/2012 | LeBeau et al. .................... | 726/3 |
| 2013/0036203 A1* | 2/2013 | Liwerant et al. .............. | 709/219 |
| 2013/0263032 A1* | 10/2013 | Vainio et al. ................... | 715/765 |

FOREIGN PATENT DOCUMENTS

JP    2009-098987 A    5/2009

* cited by examiner

*Primary Examiner* — James R Sheleheda
(74) *Attorney, Agent, or Firm* — Sony Corporation

(57) ABSTRACT

An information processing apparatus includes a communication unit, a storage, an operation reception unit, and a controller. The communication unit is capable of communicating with a different information processing apparatus and a server on a network. The storage is capable of storing data. The operation reception unit is capable of receiving an operation of a user that selects the data. The controller is capable of controlling the communication unit to transmit the selected data to the server and transmit notification information to the different information processing apparatus, the notification information indicating transmission of the data to the server.

17 Claims, 13 Drawing Sheets

FIG.5

```
Title :[VAIOEasyshare] Test.doc
Text :
<?xml version="1.0" ?>
- <ves>
- <item id="0x011">
<title>Test.doc</title>
<location>http://www.xxx.drive.com/name/Test.doc</location>
<createdTime>2010-12-17T19:00:00+0900</createdTime>
<size>12321</size>
<sender>name</sender>
<message>Material of report will be sent.</message>
</item>
</ves>
```

51, 52, 53, 54, 55

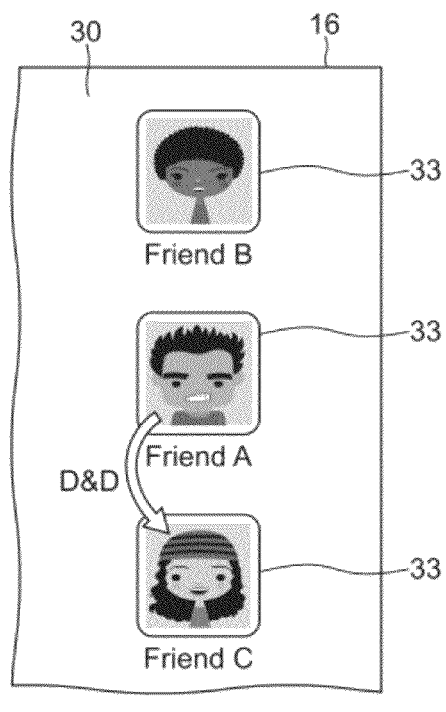 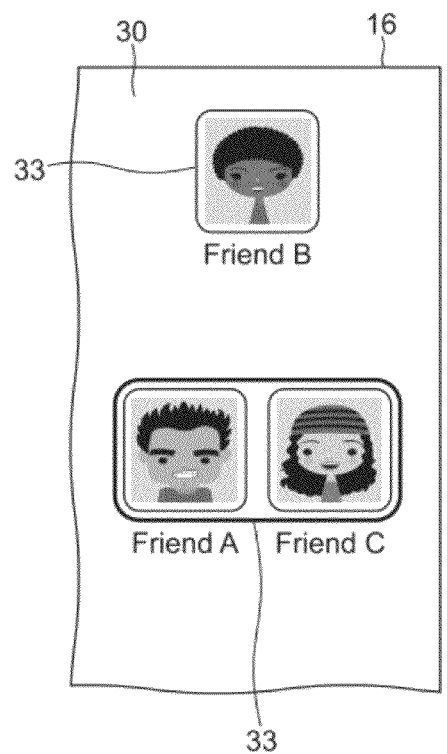

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2011-087059 filed in the Japanese Patent Office on Apr. 11, 2011, the entire content of which is incorporated herein by reference.

The present disclosure relates to an information processing apparatus capable of communicating with another information processing apparatus, and to an information processing method and a program for the information processing apparatus.

BACKGROUND

The present disclosure relates to an information processing apparatus capable of communicating with another information processing apparatus, and to an information processing method and a program for the information processing apparatus.

From the past, there have been many techniques for sharing data between an information processing apparatus (PC (Personal Computer) etc.) and another information processing apparatus. For example, there are a method of attaching data to e-mail to be transmitted from an information processing apparatus to another information processing apparatus and a method of using P2P (Peer to Peer)-type transfer software. In addition, a technique in which an information processing apparatus uploads data to a storage service (server) over a network and another information processing apparatus downloads the data from the storage service is also known (see, for example, Japanese Patent Application Laid-open No. 2009-98987).

SUMMARY

However, in the method of attaching data to e-mail, large-volume data is difficult to be transmitted, and in the method using the transfer software, an information processing apparatus on a data reception side has to be online. Further, in the method using the storage service, a user on the data reception side has to be notified of the fact that data has been uploaded to the storage service by a user on a data transmission side. Therefore, the user on the data transmission side has to make troublesome tasks for setting, on the storage service, information on his/herself, notification destination information (e-mail address etc.) of the user on the data reception side. In view of the circumstances as described above, it is desirable to provide an information processing apparatus, an information processing method, and a program that are capable of putting data into a state in which a different information processing apparatus can receive the data and easily notifying the different information processing apparatus of the state in which the data can be received, without depending on a data size and a network connection status of the different information processing apparatus.

According to an embodiment of the present disclosure, there is provided an information processing apparatus including a communication unit, a storage, an operation reception unit, and a controller. The communication unit is capable of communicating with a different information processing apparatus and a server on a network. The storage is capable of storing data. The operation reception unit is capable of receiving an operation of a user that selects the data. The controller is capable of controlling the communication unit to transmit the selected data to the server and transmit notification information to the different information processing apparatus, the notification information indicating transmission of the data to the server.

Accordingly, the information processing apparatus can put large-volume data into a state in which a different information processing apparatus can receive the data and easily notify the different information processing apparatus of the state in which the data can be received, without depending on a network connection status of the different information processing apparatus. The information processing apparatus may further include a video output unit. In this case, the controller may be capable of controlling the video output unit to output a user icon representing a user of the different information processing apparatus. Further, the controller may be capable of controlling, in a case where a predetermined operation to the output user icon by the user of the information processing apparatus is received, the communication unit to transmit the data and the notification information.

Accordingly, the information processing apparatus can transmit data to the server and transmit notification information to the different information processing apparatus on the basis of a predetermined operation to a user icon.

The controller may be capable of controlling the video output unit to output a data icon representing the data. Further, the controller may be capable of controlling, in a case where a drag-and-drop operation of the output data icon onto the user icon is received, the communication unit to transmit the data and the notification information.

Accordingly, the information processing apparatus can select data to be transmitted, and transmit data to the server and transmit notification information to the different information processing apparatus on the basis of one intuitive operation of dragging and dropping a data icon onto a user icon.

The controller may be capable of controlling the communication unit to transmit the notification information as one of e-mail and an instant message. Accordingly, the information processing apparatus can allow the user of the different information processing apparatus to easily recognize the notification information as one of e-mail and an instant message.

The different information processing apparatus may include a first different information processing apparatus and a second different information processing apparatus. In this case, the controller may be capable of controlling the video output unit to output a first user icon representing a user of the first different information processing apparatus and a second user icon representing a user of the second different information processing apparatus. Further, the controller may be capable of controlling, after a predetermined grouping operation of grouping the first user icon and the second user icon is input and in a case where a drag-and-drop operation of the data icon onto the grouped first user icon and second user icon is received, the communication unit to transmit the data to the server and transmit the notification information to the first different information processing apparatus and the second different information processing apparatus.

Accordingly, by grouping the first user icon and the second user icon, the information processing apparatus can easily select a plurality of different information processing apparatuses by the drag-and-drop operation and easily transmit data and notification information to those apparatuses.

The grouping operation may be a drag-and-drop operation of the first user icon onto the second user icon. In this case, the controller may be capable of controlling, in a case where the drag-and-drop operation serving as the grouping operation is received, the video output unit to couple the first user icon and the second user icon to each other for output.

Accordingly, by only dragging and dropping a data icon onto a coupled user icon, the user can easily transmit data and notification information.

The grouping operation may be a drag-and-drop operation of the first user icon and the second user icon onto a predetermined area. In this case, the controller may be capable of controlling, after the drag-and-drop operation serving as the grouping operation is received and in a case where a drag-and-drop operation of the data icon onto the area is received, the communication unit to transmit the data to the server and transmit the notification information to the first different information processing apparatus and the second different information processing apparatus.

Accordingly, by only dragging and dropping a data icon onto a predetermined area including a plurality of user icons, the user can easily transmit data and notification information.

The different information processing apparatus may be capable of outputting a user icon representing the user of the information processing apparatus. In this case, the notification information may include information for changing an output form of the user icon output in the different information processing apparatus.

Accordingly, by recognizing a change in output form of a user icon, the user of the different information processing apparatus can easily grasp the fact that data has been transmitted from the user of the information processing apparatus to the server.

The notification information may include information for causing the different information processing apparatus to receive the data from the server on the basis of a predetermined operation to the icon with the changed output form by the user of the different information processing apparatus.

Accordingly, by only performing a predetermined operation on a user icon with a changed output form, the user of the different information processing apparatus can easily receive data from the server.

The controller may control the communication unit to receive, from the different information processing apparatus, notification information indicating transmission of data from the different information processing apparatus to the server. Further, the controller may control, in a case where the notification information is received, the video output unit to change an output form of the user icon.

Accordingly, by recognizing a change in output form of a user icon, the user can easily grasp the fact that data has been transmitted from the user of the different information processing apparatus to the server.

According to another embodiment of the present disclosure, there is provided an information processing method including: receiving an operation of a user that selects data; transmitting the selected data to a server on a network; and transmitting notification information to a different information processing apparatus on the network, the notification information indicating transmission of the data to the server.

According to still another embodiment of the present disclosure, there is provided a program causing an information processing apparatus to execute an operation reception step, a first transmission step, and a second transmission step. In the operation reception step, an operation of a user that selects data is received. In the first transmission step, the selected data is transmitted to a server on a network. In the second transmission step, notification information is transmitted to a different information processing apparatus on the network, the notification information indicating transmission of the data to the server.

As described above, according to the present disclosure, it is possible to put data into a state in which a different information processing apparatus can receive the data and easily notify the different information processing apparatus of the state in which the data can be received, without depending on a data size and a network connection status of the different information processing apparatus.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram showing an example of notification information transmitted by the PC to another PC;

FIG. 6 are diagrams showing, as an example of grouping of user icons in the PC, a state in which a plurality of user icons are coupled;

DETAILED DESCRIPTION OF EMBODIMENTS

Hereinafter, an embodiment of the present disclosure will be described with reference to the drawings.
[Outline of System]

Figure 1:
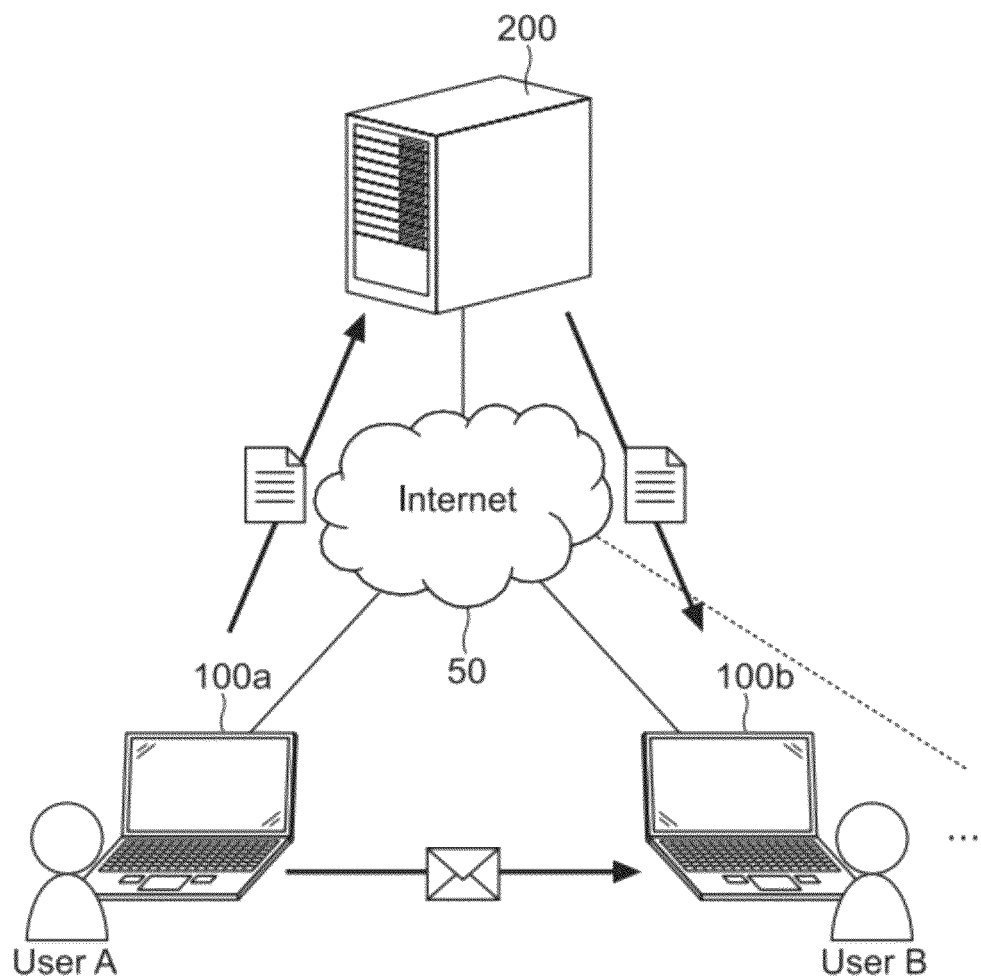
FIG. 1 is a diagram showing a structure of a data sharing system in an embodiment of the present disclosure.

FIG. 1 is a diagram showing a structure of a data sharing system in an embodiment of the present disclosure. As shown in FIG. 1, this system includes a PC (Personal Computer) 100*a*, a different PC 100*b*, and a server 200. A plurality of different PCs 100*b* may be provided in this system. The PC 100*a*, the PC 100*b*, and the server 200 are capable of communicating with one another via an Internet 50.

The PC 100*a* of a user A uploads data stored therein to the server 200 in order to share the data with the user B. The server 200 stores the uploaded data in a large-capacity storage. In this upload operation, the PC 100a transmits to the PC 100b of the user B notification information for notifying the PC 100b of the user B of the upload (of the fact that data is downloadable). Upon reception of the notification information, the PC 100b of the user B accesses the server 200 to download the data stored in the server 200.

The data uploaded to the server 200 may be text data, chart data, still image data, moving image data, sound (music) data, and any other data.

[Hardware Structure of PC]

Figure 2:
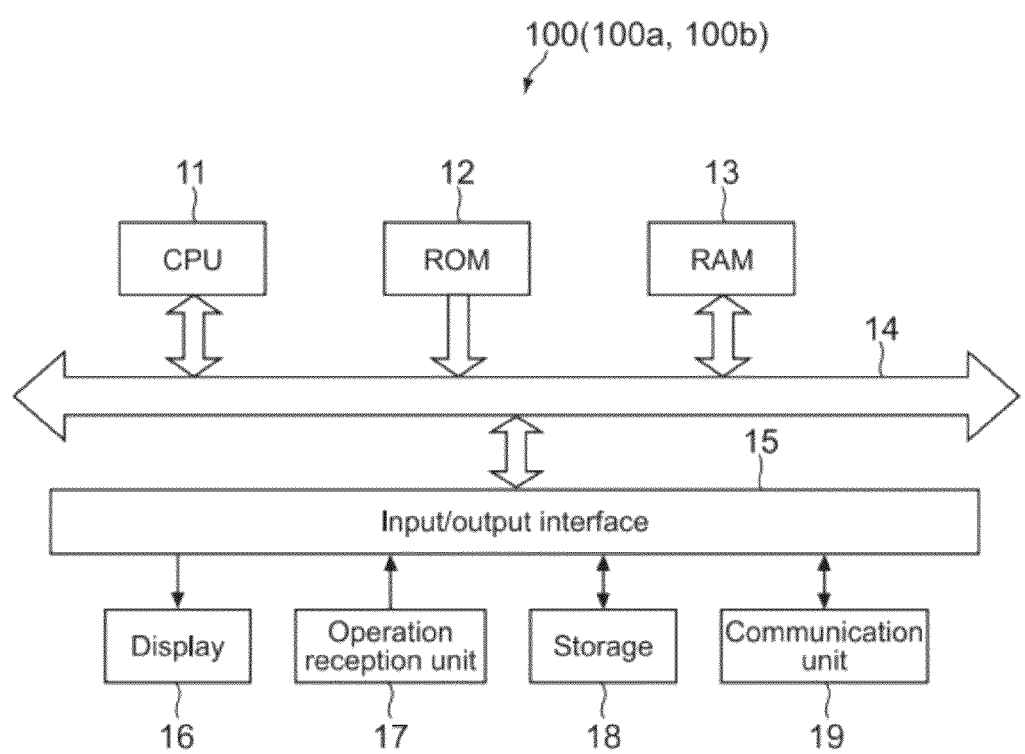
FIG. 2 is a block diagram showing a hardware structure of a PC (Personal Computer) included in the data sharing system.

FIG. 2 is a block diagram showing a hardware structure of the PCs 100 (PC 100a and PC 100b). As shown in FIG. 2, each of the PCs 100 includes a CPU (Central Processing Unit) 11, a ROM (Read Only Memory) 12, a RAM (Random Access Memory) 13, an input/output interface 15, and a bus 14 that connects those components to one another.

The CPU 11 appropriately accesses the RAM 13 and the like when necessary and performs overall control of the whole blocks of the PC 100 while performing various types of computation processing. The ROM 12 is a nonvolatile memory in which an OS to be executed by the CPU 11 and firmware such as programs and various parameters are fixedly stored. The RAM is used as a work area or the like of the CPU 11 and temporarily stores the OS, various applications in execution, and various pieces of data being processed.

Connected to the input/output interface 15 are a display 16, an operation reception unit 17, a storage 18, a communication unit 19, and the like.

The display 16 is a display device using, for example, an LCD (Liquid Crystal Display), an OELD (Organic Electro-Luminescence Display), or a CRT (Cathode Ray Tube). The display 16 may be incorporated into the PC 100 or may be externally connected to the PC 100. In the case where the display 16 is externally connected to the PC 100, a video signal is output to the display 16 via a video output unit (video output terminal or the like) included in the PC 100.

The operation reception unit 17 is, for example, a pointing device such as a mouse, a keyboard, a touch panel, or another input apparatus. In the case where the operation reception unit 17 is a touch panel, the touch panel may be integrated with the display 16.

The storage 18 is a nonvolatile memory such as an HDD (Hard Disk Drive), a flash memory (SSD; Solid State Drive), or other solid-state memory. In the storage 18, the OS, various applications, and various types of data are stored. In particular, in this embodiment, in addition to data (files of content) transmitted to the server 200, user information including a name and an e-mail address of a user of a different PC 100, an image of an icon (to be described later) representing the different user, and the like is also stored in the storage 18. Further, in addition to applications such as a mailer and an instant messenger, software and programs such as applications (data sharing application) for executing data sharing processing in this embodiment are also stored in the storage 18. The user information may be stored as part of the mailer and the instant messenger. The communication unit 19 is a NIC (Network Interface Card) or the like for connecting to the Internet 50 or a LAN (Local Area Network) in a wired manner and performs communication processing between the communication unit 19 and the server 200 or the different PC 100b. For example, the communication unit 19 uploads (transmits) data to the server 200 and transmits e-mail to the different PC 100b. Further, the communication unit 19 downloads (receives) from the server 200 data that is uploaded to the server 200 by the different PC 100b, and receives e-mail from the different PC 100b.

[Operation of System]

Next, regarding an operation of the data sharing system structured as described above, an operation of the PCs 100 (PC 100a and PC 100b) will mainly be described. This operation is performed under control of the CPU 11 in cooperation with other hardware and software (data sharing application).

(Basic Operation of PC On Data Transmission Side)

Figure 3:
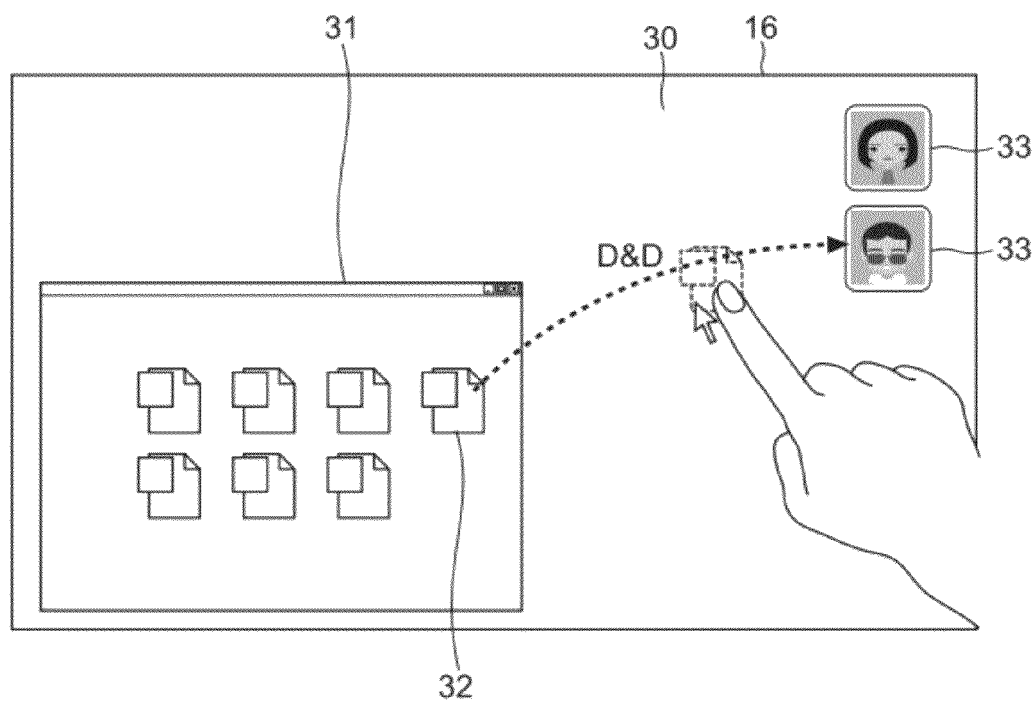
FIG. 3 is a diagram showing an operation of a user when data is uploaded from the PC to a server.

An operation of the PC 100a on a data transmission side will first be described. FIG. 3 is a diagram showing an operation of a user when data is uploaded from the PC 100a to the server 200 in this embodiment.

As shown in FIG. 3, a desktop 30 is displayed on the display 16 of the PC 100a. On the desktop 30, user icons 33 are displayed. The user icons 33 correspond to images representing users (images defined by the user of the PC 100a to represent respective users), the users being already registered in an address book of the mailer or instant messenger. For example, in the case where a predetermined operation (for example, double click) is performed on each image or column of users in a user list window of the mailer or instant messenger, a user icon 33 is generated on the desktop 30 on the basis of the image representing the user. For example, the image representing the user is selected from a predetermined list or created by the user of the PC 100a when the user of the PC 100a registers another user in the address book.

When the user icon 33 is generated, the PC 100 stores in the storage 18 address information (e-mail address), which has been registered in the address book of the mailer or instant messenger, while associating the address information with the generated user icon 33. In the case where an icon of a data file is dropped onto the user icon 33, the PC 100 transmits data corresponding to the data icon to the server 200 and assigns a function of transmitting notification information to an e-mail address corresponding to the user icon 33.

A location where the user icons 33 are displayed is not limited to the desktop 30. In other words, the user icons 33 may each be displayed as a widget of a GUI (Graphical User Interface) of the data sharing application or the mailer or instant messenger.

The user of the PC 100a drags and drops an icon 32 of a data file (hereinafter, referred to as data icon 32) that the user wants to share with the user of the different PC 100b, from an arbitrary directory (for example, window 31 or desktop 30) onto a user icon 33 corresponding to the user who shares the data. The drag-and-drop operation may be performed by a pointer operation using a mouse. Alternatively, in the case where the PC 100 includes a touch panel or a touchpad, the drag-and-drop operation may be performed by a touch operation using a finger.

By the drag-and-drop operation, data corresponding to the data icon 32 is transmitted to the server 200, and notification information is transmitted to an e-mail address of a user corresponding to the user icon 33 onto which the data icon 32 has been dropped. Details of this processing will be described below.

Figure 4:
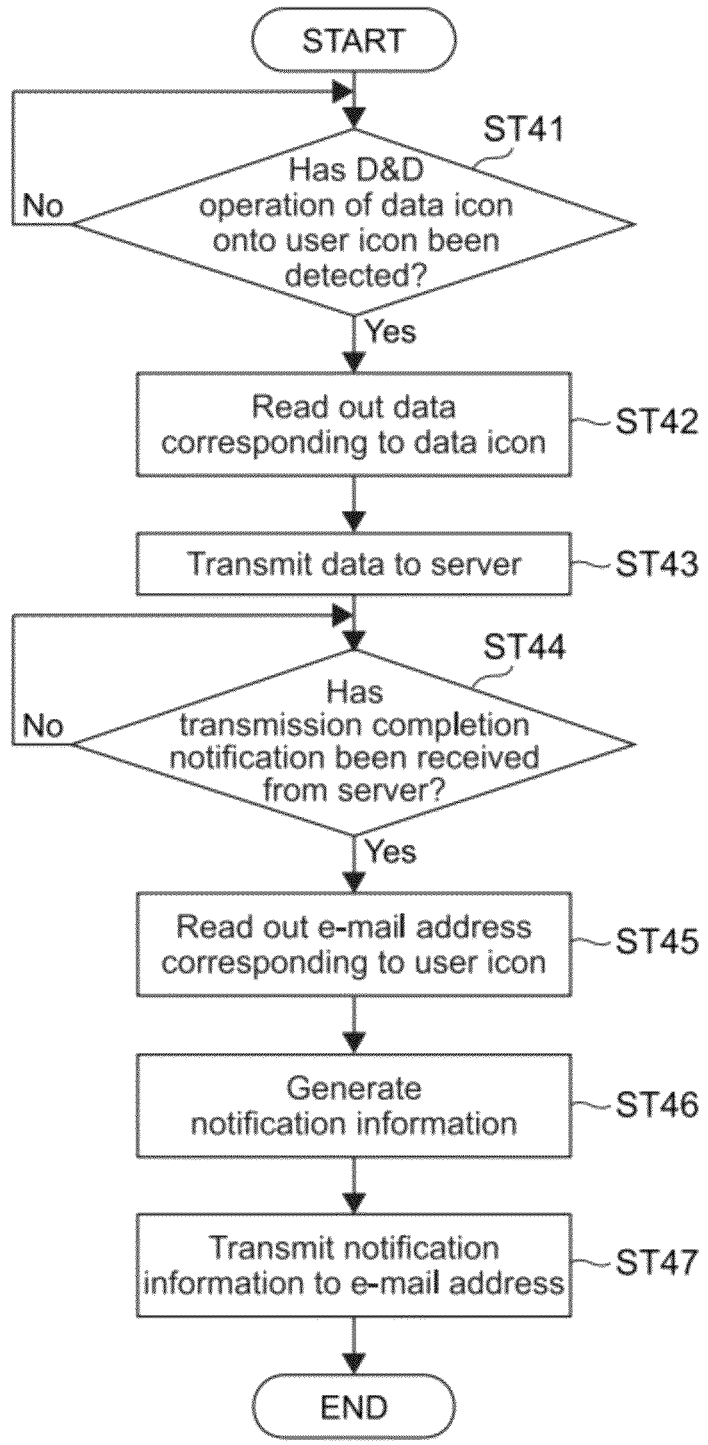
FIG. 4 is a flowchart showing a procedure of data transmission processing by the PC.

FIG. 4 is a flowchart showing a procedure of the transmission processing for the data and the notification information by the PC 100a.

As shown in FIG. 4, the CPU 11 of the PC 100a first determines whether an operation of dragging and dropping the data icon 32 onto a specific user icon 33 has been detected (Step 41).

When determining that the drag-and-drop operation has been detected (Yes), the CPU 11 reads out data corresponding to the dragged data icon 32 from the storage 18 (Step 42), and transmits the data to the server 200 (Step 43).

Subsequently, the CPU 11 determines whether transmission completion notification of the transmitted data has been received from the server 200 (Step 44). When determining that the notification has been received (Yes), the CPU 11 reads out an e-mail address corresponding to the user icon 33 onto which the data icon 32 has been dropped from the storage 18 (Step 45).

Then, the CPU 11 generates notification information directed to the read-out e-mail address (Step 46), and transmits the notification information to the e-mail address (of the different PC 100b) (Step 47).

FIG. 5 is a diagram showing an example of the notification information generated and transmitted as described above.

The notification information is transmitted using a mailer or an instant messenger. It should be noted that in order to distinguish e-mail or an instant message as the notification information from normal e-mail or a normal instant message, the e-mail or the instant message as the notification information includes a specific character string indicating notification that data has been uploaded to the server 200. FIG. 5 shows the notification information as e-mail, and the specific character string 51 is included in a title of the e-mail (in the example of FIG. 5, a character string "VAIOEasyshare" corresponds thereto). Further, the character string may be included in a text of the e-mail or instant message.

The text of the e-mail or instant message is described as, for example, an XML (Extensible Markup Language) document. The XML document includes items of a title (file name) 52 of the transmitted data, a storage location (URL) 53 of the data in the server 200, a name 54 of a sender (user of PC 100a), and a predetermined message 55.

The different PC 100b that has received the notification information (e-mail or instant message) can recognize, from the items described above, that the notification is for indicating that the data has been uploaded to the server 200 and indicating a sender of the notification information, a file name of the data, a storage location, and the like. By clicking a storage location (URL) of the data described in the e-mail or instant message, the user can easily access the data transmitted to the server without separately launching an application (browser software).

(Grouping of User Icons)

In the example shown in FIG. 3, the user icon 33 is associated with a single user so that the notification information is transmitted only to the user by the drag-and-drop operation and the data can be downloaded from the server 200 by the user. However, the user of the PC 100a may want to share the same data with a plurality of users in some cases. In this regard, in this embodiment, the PC 100a can group the plurality of user icons 33 and collectively transmit notification information to a plurality of different PCs 100b by a single drag-and-drop operation.

As forms of grouping the user icons 33, for example, a technique of coupling a plurality of user icons 33 and a technique of managing a plurality of user icons 33 in a predetermined collective transmission area are conceived. Hereinafter, those techniques will be described.

FIG. 6 are diagrams showing, as an example of grouping of the user icons 33, a state in which a plurality of user icons 33 are coupled.

When a user drags and drops a certain user icon 33 onto a different user icon 33 as shown in FIG. 6A, two user icons 33 are coupled to each other and displayed such that a right side of one of the icons and a left side of the other icon become one as shown in FIG. 6B, for example.

Further, the coupling of user icons 33 can also be performed on two or more user icons 33. FIG. 7 are diagrams each showing a state in which a coupled user icon 33 is further coupled with another user icon 33.

Figure 7A:
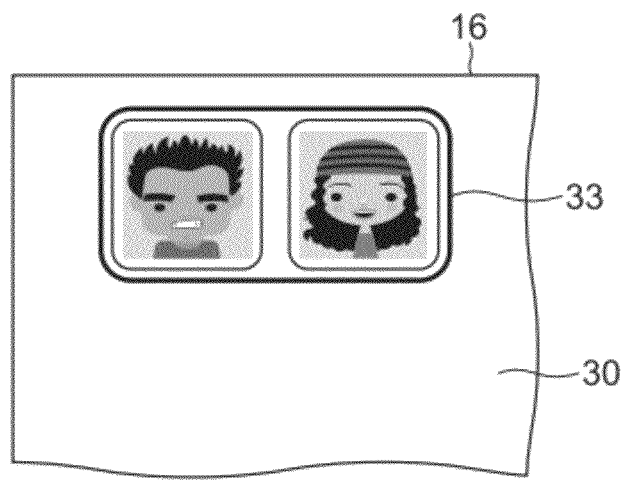
FIG. 7 are diagrams each showing a state in which the user icon coupled in the PC is further coupled with a user icon.
Figure 7B:
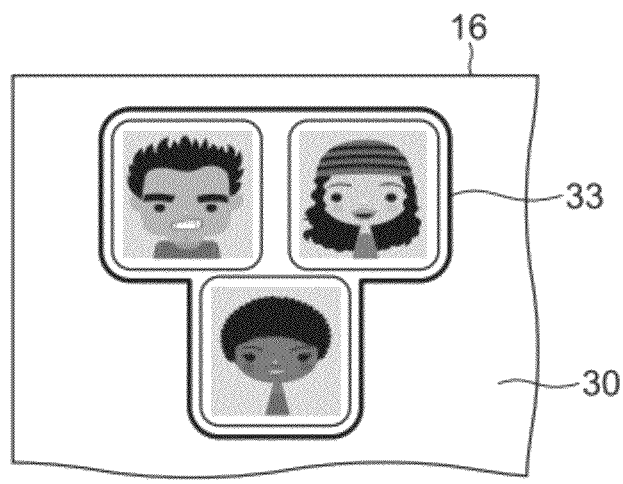

When a different user icon 33 is dragged and dropped onto the coupling of two user icons 33 shown in FIG. 7A (hereinafter, referred to also as coupled user icon 33), as shown in FIG. 7B, the different user icon 33 is coupled to the coupled user icon 33 so that a new coupled user icon 33 is generated. Although FIG. 7B shows an example in which an upper side of the different user icon 33 is coupled to a lower side of the coupled user icon 33 at the center thereof, the coupling form is not limited thereto.

Figure 7C:
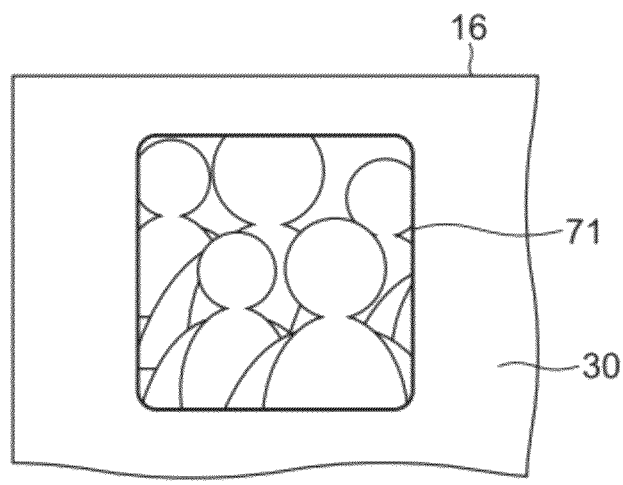

Then, when further another user icon 33 is dragged and dropped onto the coupled user icon 33 in which a predetermined number (threshold value) of user icons 33 are coupled to one another, as shown in FIG. 7C, the display form of the coupled user icon 33 is changed from a form in which the user icons 33 are coupled to one another into a group icon 71 indicating that a plurality of users are grouped. This operation takes into account the fact that the coupling of too many user icons 33 makes a display area therefor larger and makes it difficult to distinguish user icons 33 serving as sources of the coupling from one another even if the size of the coupled user icon is reduced for display. The threshold value is three, for example, but it is not limited thereto. Further, there may be a case where the group icon 71 is generated by coupling of user icons 33 or generated by user icons 33. In the case where a user icon 33 is further dragged and dropped onto the group icon 71, the display form of the group icon 71 may not be changed, and only user information corresponding to the user icon 33 may be changed. Alternatively, the display form of the group icon 71 may be changed in accordance with the number of corresponding users.

Figure 8:
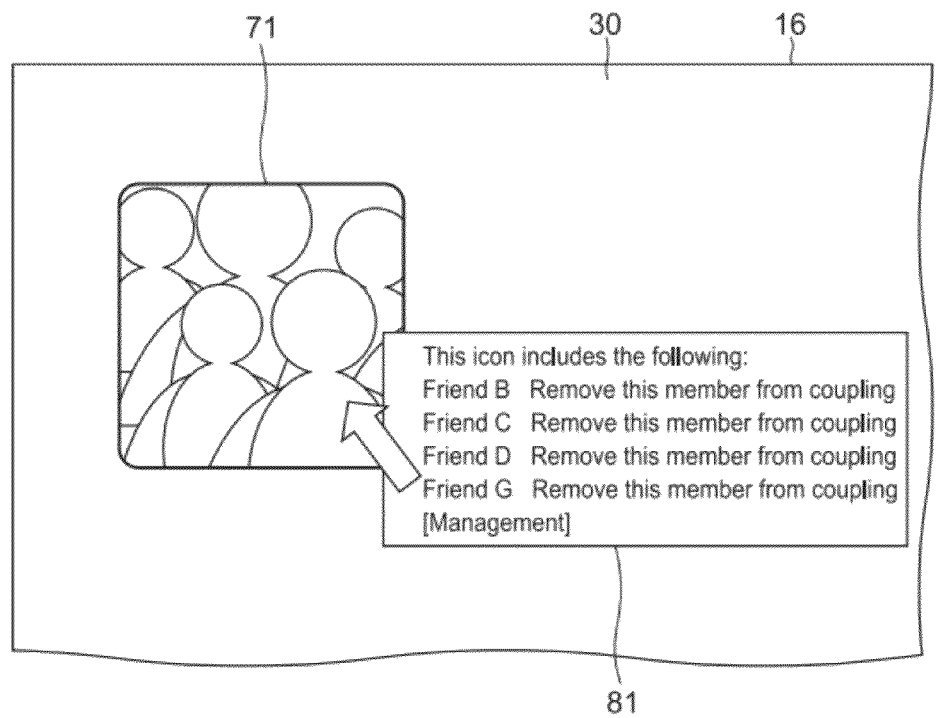
FIG. 8 is a diagram showing a management technique for a group icon generated by the PC.

The group icon 71 is not created based on images of respective user icons 33 serving as sources of the coupling, and therefore it is difficult for a user to identify one by one a plurality of users corresponding to the group icon 71 when the user views the group icon 71. In this regard, as shown in FIG. 8, in the case where a mouse pointer is placed over the group icon 71 or touches the group icon 71 for example, the PC 100 can display a user list 81 in a pop-up window. The user list 81 shows all users corresponding to the group icon 71.

The user list 81 shows names of users as group members. Further, on the user list 81, an operation of removing any user as a group member from the group can be performed. Specifically, when a user clicks or touches a specific user item in the user list 81, a user corresponding to that item is removed from the group. In the case where the number of users corresponding to the group icon 71 is set to the threshold value or less by the removal operation, the display form is changed into one in which images of the user icons 33 are coupled to one another as shown in FIG. 7B. In addition, by selecting a "Management" item in the user list 81, a user can manage the members of the group accurately. As detailed management, for example, a setting for excluding a specific user from reception targets of a specific data file and the like are conceived.

Figure 9:
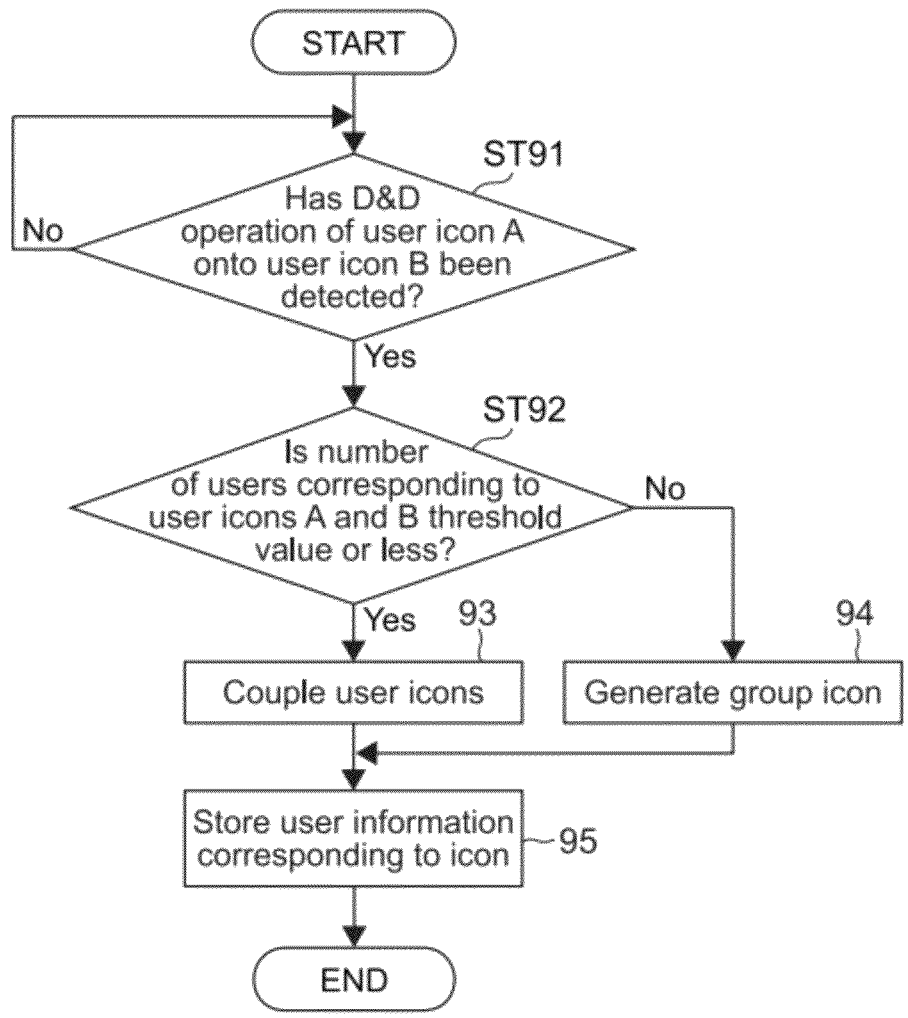
FIG. 9 is a flowchart showing a procedure of coupling processing for user icons by the PC.

FIG. 9 is a flowchart showing a procedure of coupling processing for the user icons 33 described above. As shown in FIG. 9, the CPU 11 of the PC 100a first determines whether an operation of dragging and dropping a user icon A onto another user icon B has been detected (Step 91). Here, each of the user icons A and B may form a coupled user icon.

When determining that the drag-and-drop operation has been detected (Yes), the CPU 11 determines whether the total number of users corresponding to the user icon A and users corresponding to the user icon B is the threshold value or less (Step 92).

When determining that the total number of users is the threshold value or less (Yes), the CPU 11 couples the user icon A and the user icon B to each other as shown in FIG. 6 (Step 93).

When determining that the total number of users exceeds the threshold value (No), the CPU 11 generates and displays the group icon 71 in place of the user icon A and the user icon B (Step 94).

Then, the CPU 11 associates user information corresponding to the above-mentioned coupled user icon 33 or group icon 71 with the icons and stores the associated user information (Step 95). Accordingly, to the coupled user icon 33 or the group icon 71, a function of transmitting a file corresponding to the data icon 32 to the server 200 and a function of transmitting the notification information to e-mail addresses of a plurality of users corresponding to the coupled user icon 33 or the group icon 71 are assigned.

Figure 10:
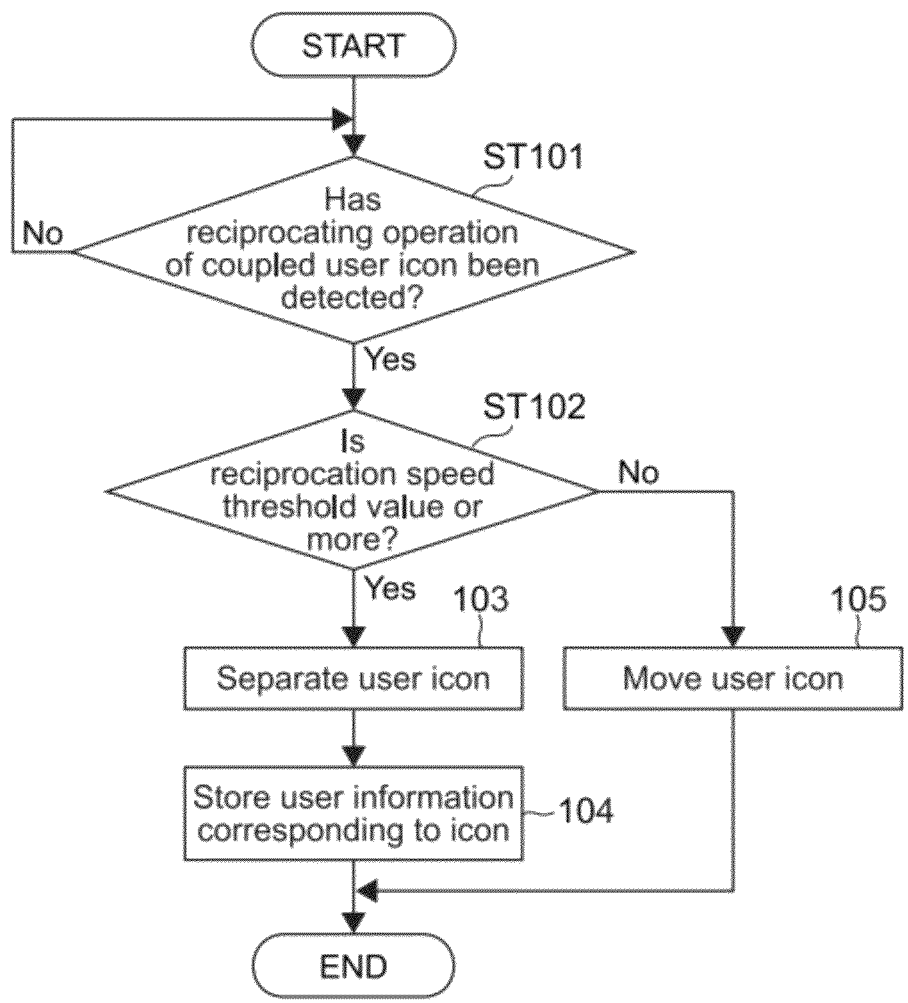
FIG. 10 is a flowchart showing a procedure of separation processing for a coupled user icon by the PC.

Although description has been made on that group members corresponding to the group icon 71 can be removed from the user list 81, the coupled user icon 33 in which the user icons 33 of the number equal to or smaller than the threshold value are coupled to one another can be separated into icons. The separation is, for example, realized by a shake operation of the coupled user icon 33 (reciprocating operation at a predetermined speed or more). FIG. 10 is a flowchart showing a procedure of separation processing for a coupled user icon 33.

As shown in FIG. 10, the CPU 11 first determines whether a reciprocating operation of a coupled user icon 33 has been detected (Step 101). When determining that the reciprocating operation has been determined (Yes), the CPU 11 determines whether a speed of the reciprocation is a predetermined threshold value or more (Step 102).

When determining that the speed of the reciprocation is the predetermined threshold value or more (Yes), the CPU 11 determines that the operation is a shake operation and separates the coupled user icon 33 into the user icons 33 serving as sources of the coupling to be displayed (Step 103). Then, the CPU 11 stores user information corresponding to each of the separated user icons 33 in association with the user icon 33 (Step 104).

Here, in the case where the coupled user icon 33 is constituted of three or more user icons 33 coupled to one another, one user icon 33 may be separated from the coupled user icon 33 in each shake operation. Further, in this case, in the coupled user icon 33, a user icon 33 at a position at which a pointer of the mouse or a finger is located may remain at the position, and the other user icons 33 may be all separated from one another. For example, in the coupled user icon 33 in which three user icons A, B, and C are coupled to one another, in the case where a shake operation is performed with the pointer or finger being placed on the user icon A, the user icon A may remain at hand and the other two user icons B and C may be separated and displayed at distant positions. In addition, in the case where a shake operation is performed with the pointer or finger being placed at a coupling point of the user icons A and B, the user icons A and B may remain at hand and the user icon C may be separated and displayed at a distant position.

In the case where the speed of the reciprocation is the threshold value or less in Step 102 described above, the CPU 11 determines that the reciprocating operation is merely an operation of moving the coupled user icon 33, and moves the coupled user icon 33 to a position corresponding to the movement of the mouse or finger.

FIG. 11 are diagrams showing, as another example of grouping of the user icons 33, a state in which a plurality of user icons 33 are managed in a predetermined collective transmission area.

Figure 11A:
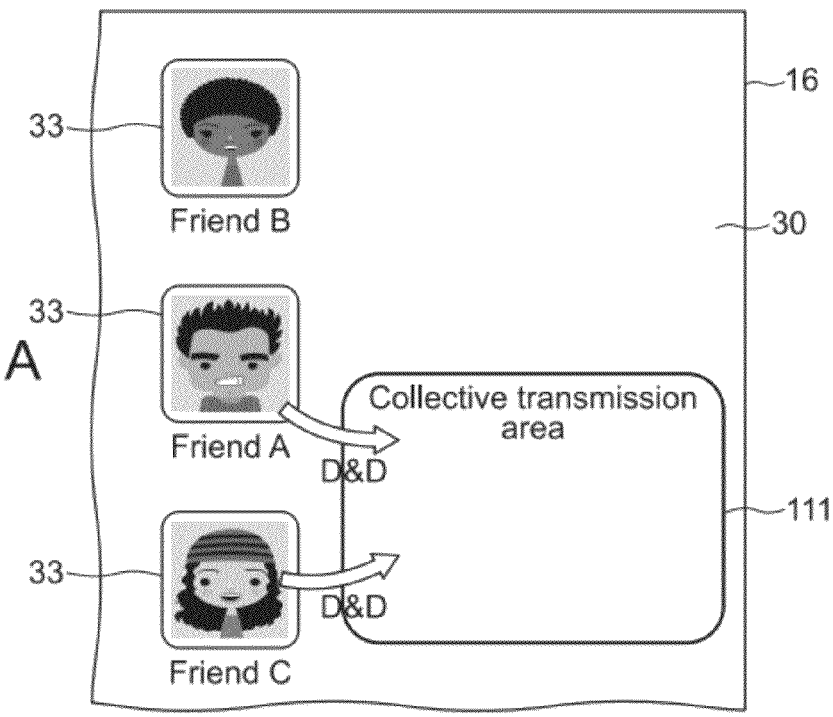
FIG. 11 are diagrams showing another example of grouping of user icons by the PC.

As shown in FIG. 11A, for example, a collective transmission area 111 for managing the plurality of user icons 33 as a group similarly to the coupled user icon 33 and the group icon 71 is displayed on the desktop 30. As a matter of course, the display location of the collective transmission area 111 is not limited to the desktop 30.

Figure 11B:
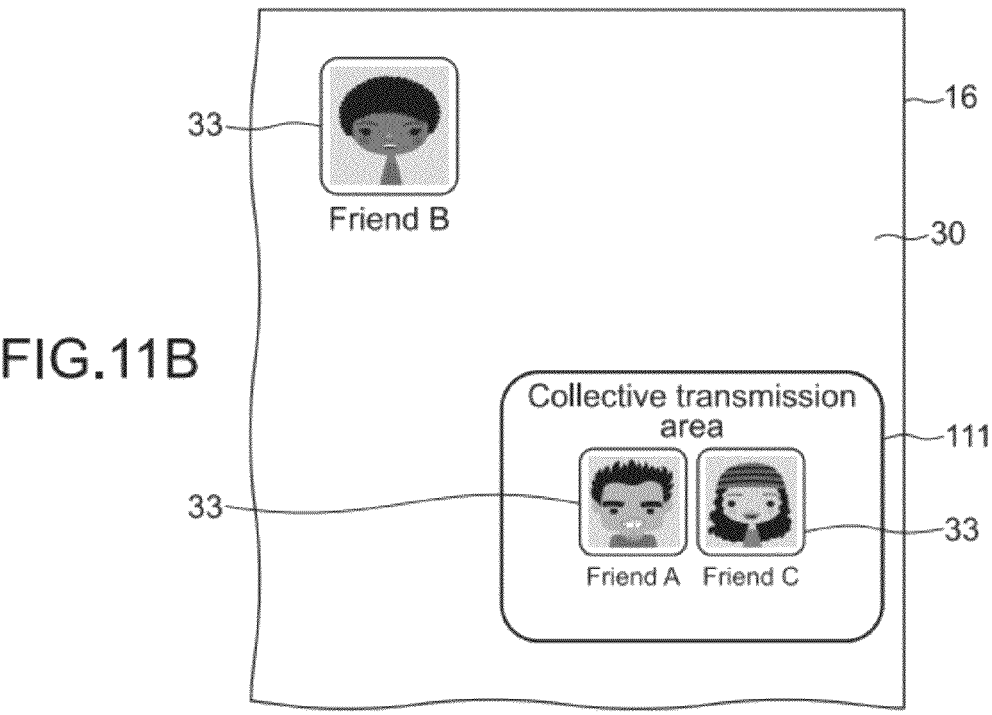

In the case where a user drags and drops a plurality of user icons 33 one by one onto the collective transmission area 111, the user icons 33 are displayed in a line for example, as shown in FIG. 11B. Then, in the case where the data icon 32 is dragged and dropped onto the collective transmission area 111, the PC 100 transmits data corresponding to the data icon 32 to the server 200 and transmits notification information to e-mail addresses of users corresponding to all the user icons 33 in the collective transmission area 111.

Further, when the user drags and drops a specific user icon 33 from the collective transmission area 111 to the outside thereof, the specific user icon 33 can be removed from the group. In other words, by the drag-and-drop operation to the outside of the collective transmission area 111, user information is updated such that a piece of user information corresponding to the specific user icon 33 is removed from the pieces of user information that have been grouped.

In this manner, a plurality of user icons 33 are grouped by the coupling of the user icons 33 or the drag-and-drop operation of the user icons 33 onto the collective transmission area 111, with the result that a user can establish a state in which a plurality of users can receive data from the server 200, by one drag-and-drop operation.

(Basic Operation of PC On Data Reception Side)

Figure 12:
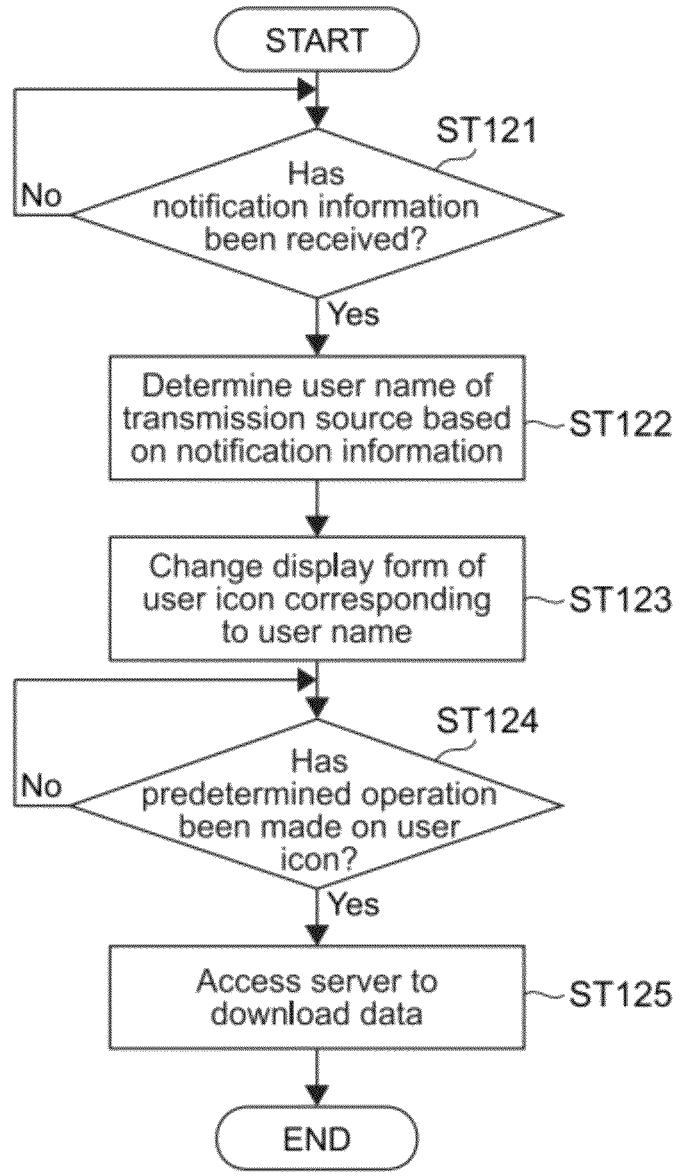
FIG. 12 is a flowchart showing a procedure of reception processing for data and notification information and data by another PC that has received notification information from the PC.

Next, an operation of the PC 100b on a data reception side will be described. FIG. 12 is a flowchart showing a procedure of reception processing for notification information and data by the PC 100b that has received the notification information from the PC 100a. Here, it is assumed that a user icon 33 similar to that of the PC 100a is also generated and displayed on the desktop 30 of the PC 100b, for example.

As shown in FIG. 12, the CPU 11 of the PC 100b determines whether the notification information has been received at regular intervals, for example (Step 121). When determining that the notification information has been received (Yes), the CPU 11 analyzes the details of the notification information (FIG. 5) and determines a user name of the transmission source (Step 122).

Subsequently, the CPU 11 changes a display form of a user icon 33 corresponding to the determined user name. Here, for the change of display forms, for example, a technique of changing a user icon 33 itself as shown in FIG. 13 and a technique of displaying a user icon 33 with a pop-up window as shown in FIG. 14 are conceived.

Figure 13A:
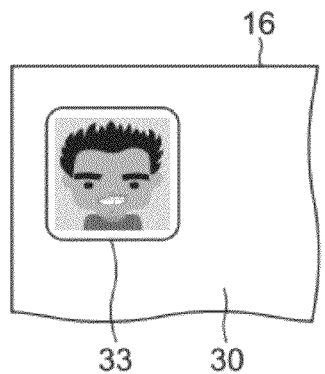
FIG. 13 are diagrams showing an example of a change in display form of a user icon in another PC that has received the notification information from the PC.
Figure 13B:
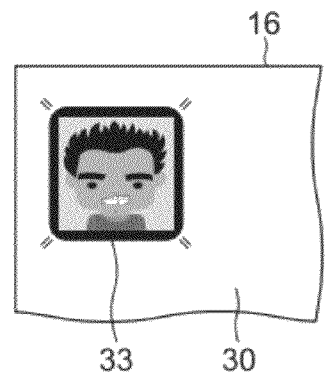

As shown in FIG. 13, the CPU 11 of the PC 100b may cause, for example, a circumference of the user icon 33 corresponding to the notification information to blink in a predetermined color, for example. Further, the circumference of the user icon 33 may light up instead of blinking. In addition, an expression of a face represented by the user icon 33 may change. In this case, image data of a user icon 33 corresponding to the changed expression of the face is also stored in the storage 18 of the PC 100b.

Figure 14A:
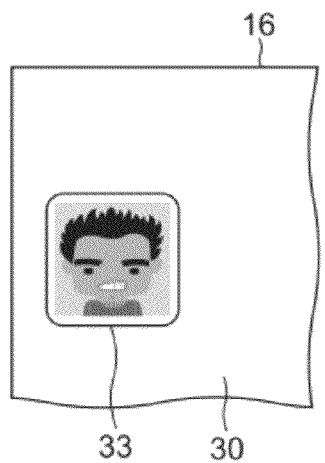
FIG. 14 are diagrams showing another example of a change in display form of a user icon in another PC that has received the notification information from the PC.
Figure 14B:
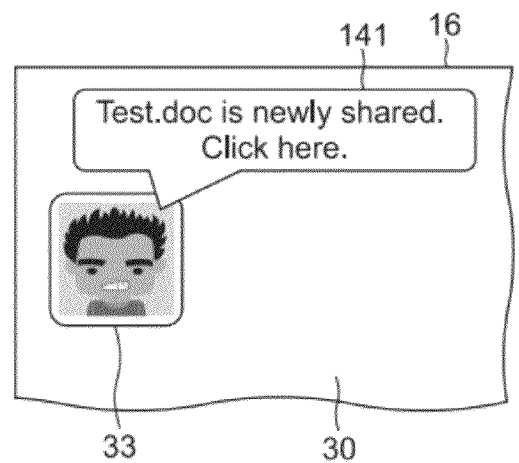

As shown in FIG. 14, the CPU 11 of the PC 100b may display character information indicating that data to be shared has been uploaded to the server 200, on the user icon 33 corresponding to the notification information with use of a pop-up 141. In the character information, a file name of the data or a user name of a transmission source may be displayed.

In this manner, when the PC 100b receives the notification information, the display form of the user icon 33 corresponding to the notification information is changed so that the user of the PC 100b can be allowed to easily grasp that the data has been shared.

The change in display form of the user icon 33 is done by an operation of a sharing application held by the PC 100b, for example. However, the display form is changed with reception of the notification information as a trigger, and in terms of this, it can be said that the notification information transmitted by the PC 100a on the data transmission side can be information for changing a display form of a user icon 33 corresponding to the notification information in the PC 100b on the data reception side. Further, the notification information actually includes a program for changing a display form of a user icon 33 of the PC 100b serving as a reception destination. The program may be executed separately from or in cooperation with the sharing application of the PC 100b so that the display form is changed.

With reference back to FIG. 12, the CPU 11 determines whether a predetermined operation has been made by a user on the user icon 33 whose display form has been changed (Step 124). The predetermined operation is, for example, a double click (double tap), but it is not limited thereto. When determining that the predetermined operation has been made (Yes), the CPU 11 accesses a storage area of the server 200 to download data on the basis of the URL included in the notification information (Step 125).

Here, when the server 200 is accessed, access limit information may be set. In other words, in the case where the server 200 is accessed by the PC 100b, the server 200 may prompt the user to input a preset ID or password.

[Conclusion]

As described above, according to this embodiment, by the drag-and-drop operation of the data icon 32 onto the user icon 33, which is an extremely intuitive and easy operation, the PC 100a can allows data to be shared with the user of the different PC 100b. Further, the PC 100a uploads data to the server 200 and also directly transmits notification information to the different PC 100b, with the result that the user of the different PC 100b can be allowed to easily grasp that the data has been uploaded.

[Modified Example]

The present disclosure is not limited to the embodiment described above, and may be variously modified without departing from the gist of the present disclosure.

In the embodiment described above, the PC 100a described as a data transmission source can be a reception destination of data and notification information, similar to the PC 100b described as a transmission destination of data and notification information. Conversely, the PC 100b can be a transmission source of data and notification information. Therefore, when the PC 100a receives notification information from the PC 100b or the like, the PC 100a can also change a display form of a user icon 33 corresponding to a user B of the PC 100b serving as a transmission source of the notification information. Further, the PC 100b can also execute the transmission processing for data and notification information, the grouping processing for user icons 33, and the like on the basis of the drag-and-drop operation of the data icon 32.

In the embodiment described above, the PC 100b that has downloaded data may transmit information (reception confirmation information) for notifying the PC 100a on the data transmission side of that the PC 100b has downloaded data. Further, upon reception of that information, the PC 100a on the data transmission side may change a display form of a user icon corresponding to the user of the PC 100b. This technique of changing a display form can be different from the display forms shown in FIGS. 13 and 14, for example. Accordingly, the user of the PC 100a can recognize whether the change in display form of the user icon 33 represents reception confirmation from the user of the PC 100b or upload notification from the user of the PC 100b.

In the embodiment described above, the user of the PC 100a on the data transmission side and the user of the PC 100b on the data reception side are different users, but both the users may be the same user.

In the embodiment described above, the example in which the present disclosure is applied to a PC has been described, but the present disclosure may be similarly applicable to any other information processing apparatuses such as a cellular phone, a smartphone, an audio player, a television apparatus, a game console, a car navigation apparatus, and a recording and reproducing apparatus. Further, the information processing apparatus on the data transmission side and the information processing apparatus on the data reception side may be different types of information processing apparatuses.

[Others]

The present disclosure can take the following structures.

(1) An information processing apparatus, including:
  a communication unit capable of communicating with a different information processing apparatus and a server on a network;
  a storage capable of storing data;
  an operation reception unit capable of receiving an operation of a user that selects the data; and
  a controller capable of controlling the communication unit to transmit the selected data to the server and transmit notification information to the different information processing apparatus, the notification information indicating transmission of the data to the server.

(2) The information processing apparatus according to Item (1), further including a video output unit, in which
  the controller is capable of controlling the video output unit to output a user icon representing a user of the different information processing apparatus, and
  the controller is capable of controlling, in a case where a predetermined operation to the output user icon by the user of the information processing apparatus is received, the communication unit to transmit the data and the notification information.

(3) The information processing apparatus according to Item (2), in which
  the controller is capable of controlling the video output unit to output a data icon representing the data, and
  the controller is capable of controlling, in a case where a drag-and-drop operation of the output data icon onto the user icon is received, the communication unit to transmit the data and the notification information.

(4) The information processing apparatus according to any one of Items (1) to (3), in which
  the controller is capable of controlling the communication unit to transmit the notification information as one of e-mail and an instant message.

(5) The information processing apparatus according to Item (3) or (4), wherein
  the different information processing apparatus includes a first different information processing apparatus and a second different information processing apparatus,
  the controller is capable of controlling the video output unit to output a first user icon representing a user of the first different information processing apparatus and a second user icon representing a user of the second different information processing apparatus, and the controller is capable of controlling, after a predetermined grouping operation of grouping the first user icon and the second user icon is input and in a case where a drag-and-drop operation of the data icon onto the grouped first user icon and second user icon is received, the communication unit to transmit the data to the server and transmit the notification information to the first different information processing apparatus and the second different information processing apparatus.

(6) The information processing apparatus according to Item (5), in which the grouping operation is a drag-and-drop operation of the first user icon onto the second user icon, and the controller is capable of controlling, in a case where the drag-and-drop operation serving as the grouping operation is received, the video output unit to couple the first user icon and the second user icon to each other for output.

(7) The information processing apparatus according to Item (5), in which the grouping operation is a drag-and-drop operation of the first user icon and the second user icon onto a predetermined area, and the controller is capable of controlling, after the drag-and-drop operation serving as the grouping operation is received and in a case where a drag-and-drop operation of the data icon onto the area is received, the communication unit to transmit the data to the server and transmit the notification information to the first different information processing apparatus and the second different information processing apparatus.

(8) The information processing apparatus according to any one of Items (2) to (7), in which the different information processing apparatus is capable of outputting a user icon representing the user of the information processing apparatus, and the notification information includes information for changing an output form of the user icon output in the different information processing apparatus.

(9) The information processing apparatus according to Item (8), in which the notification information includes information for causing the different information processing apparatus to receive the data from the server on the basis of a predetermined operation to the icon with the changed output form by the user of the different information processing apparatus.

(10) The information processing apparatus according to any one of Items (2) to (9), in which the controller controls the communication unit to receive, from the different information processing apparatus, notification information indicating transmission of data from the different information processing apparatus to the server, and the controller controls, in a case where the notification information is received, the video output unit to change an output form of the user icon.

What is claimed is:

1. An information processing apparatus, comprising:
a communication unit operable to communicate with one or more different information processing apparatuses and a server on a network;
an operation reception unit operable to receive an operation of a first user that selects data; and
a controller operable to control the communication unit to transmit the selected data to the server and transmit notification information to the one or more different information processing apparatuses, the notification information indicating transmission of the data to the server,
wherein the controller is operable to:
cause a plurality of user icons representing different users of the one or more different information processing apparatuses to be generated and displayed on a display device; and
group at least one pair of the plurality of user icons to generate a group icon based on a drag-and-drop operation of one of the plurality of user icons onto another of the plurality of user icons,
wherein the at least one pair of the plurality of user icons are separated from the group icon based on a predefined operation, wherein the predefined operation is a cursor shake operation over the group icon.

2. The information processing apparatus according to claim 1, wherein the controller is operable to control the communication unit to transmit the notification information as one of electronic mail (e-mail) or an instant message.

3. The information processing apparatus according to claim 1, wherein the one or more different information processing apparatuses comprise a first information processing apparatus and a second information processing apparatus,
wherein the controller is operable to cause a first user icon representing a user of the first information processing apparatus and a second user icon representing a user of the second information processing apparatus to be output, and
wherein the controller is operable to control, after a predetermined grouping operation of grouping the first user icon and the second user icon is input and when a drag-and-drop operation of a data icon, representative of the selected data, onto the grouped first user icon and second user icon is received, the communication unit to transmit the data to the server and the notification information to the first information processing apparatus and the second information processing apparatus.

4. The information processing apparatus according to claim 3, wherein the grouping operation is a drag-and-drop operation of the first user icon onto the second user icon.

5. The information processing apparatus according to claim 3,
wherein the grouping operation is a drag-and-drop operation of the first user icon and the second user icon onto a predetermined area, and
wherein the controller is operable to control, after the drag-and-drop operation serving as the grouping operation is received and when a drag-and-drop operation of the data icon onto the predetermined area is received, the communication unit to transmit the data to the server and the notification information to the first information processing apparatus and the second information processing apparatus.

6. The information apparatus according to claim 1, wherein the one or more different information processing apparatuses are operable to output a user icon representing the first user of the information processing apparatus, and
wherein the notification information comprises information for changing an output form of the user icon output in the one or more different information processing apparatuses.

7. The information processing apparatus according to claim 6, wherein the notification information comprises information for causing the one or more different information processing apparatuses to receive the data from the server based on a predetermined operation to the user icon with the changed output form by different users of the one or more different information processing apparatuses.

8. The information processing apparatus according to claim 1, wherein the controller controls the communication unit to receive, from at least one of the one or more different information processing apparatuses, notification information indicating transmission of data from the at least one of the one or more different information processing apparatuses to the server, and the controller controls a change to an output form of one of the plurality of user icons when the notification information is received.

9. The information processing apparatus according to claim 1, wherein the controller is operable to cause a data icon representative of the selected data to be displayed on the display device.

10. The information processing apparatus according to claim 1,
wherein the controller is operable to cause a user icon representing a second user of the one or more different information processing apparatuses to be generated and displayed on the display device, and enable a drag-and-drop operation to be performed in which the first user is able to drag a data icon, representative of the selected data, to the user icon and drop the data icon thereon,
whereupon the communication unit causes the selected data represented by the data icon to be output to the server and the notification information to be transmitted to the one or more different information processing apparatuses independent of additional operation by the first user.

11. The information processing apparatus according to claim 1, wherein a user list is displayed corresponding to the group icon, wherein the user list comprises a setting to exclude at least one user corresponding to the group icon from the transmission of the selected data, wherein the user list is displayed in response to touching or placing a cursor on the group icon.

12. The information processing apparatus according to claim 11, wherein the setting comprises excluding the at least one user corresponding to the group icon from receiving the selected data.

13. An information processing method, said method comprising:
in an information processing apparatus capable of being connected to a network:
receiving an operation of a first user that selects data;
transmitting the selected data to a server on the network;
transmitting notification information to one or more different information processing apparatuses on the network, the notification information indicating transmission of the data to the server; and
causing a plurality of user icons representing different users of the one or more different information processing apparatuses to be generated and displayed on a display device,
grouping at least one pair of the plurality of user icons to generate a coupled user icon based on a drag-and-drop operation of one of the plurality of user icons onto another of the plurality of user icons; and
separating the at least one pair of the plurality of user icons from the coupled user icon based on a predefined operation, wherein the predefined operation is a cursor shake operation over the coupled user icon.

14. The information processing method according to claim 13, further comprising determining whether the predefined operation on the coupled user icon is detected.

15. The information processing method according to claim 13, further comprising determining whether a speed of the predefined operation on the coupled user icon exceeds a predetermined threshold and separating the coupled user icon when the speed exceeds the predetermined threshold.

16. A non-transitory computer readable storage memory having stored thereon a program causing an information processing apparatus having a display device and being connectable to a network to perform:
receiving an operation of a user that selects data;
transmitting the selected data to a server on the network;
transmitting notification information to one or more different information processing apparatuses on the network, the notification information indicating transmission of the data to the server;
causing a plurality of user icons representing different users of the one or more different information processing apparatuses to be generated and displayed on a display device; and
grouping at least one pair of the plurality of user icons to generate a group icon based on a drag-and-drop operation of one of the plurality of user icons onto another of the plurality of user icons,
wherein the at least one pair of the plurality of user icons are separated from the group icon based on a predefined operation, wherein the predefined operation is a cursor shake operation over the group icon.

17. An information processing method, comprising:
in an information processing apparatus capable of being connected to a network:
receiving an operation of a first user that selects data;
transmitting the selected data to a server on the network;
transmitting notification information to one or more different information processing apparatuses on the network, the notification information indicating transmission of the data to the server;
causing a plurality of user icons representing different users of the one or more different information processing apparatuses to be generated and displayed on a display device;
determining whether a speed of a predefined operation on a group icon exceeds a predetermined threshold, the group icon comprising a grouping of at least one pair of the plurality of user icons; and
separating the at least one pair of the plurality of user icons from the group icon when the speed exceeds the predetermined threshold.

* * * * *